(12) United States Patent
Smith

(10) Patent No.: US 7,419,175 B2
(45) Date of Patent: Sep. 2, 2008

(54) SELF-PROPELLED TREADMILL RECREATIONAL VEHICLE

(75) Inventor: Gregory T. Smith, Mantorville, MN (US)

(73) Assignee: Hikecycle, Incorporated, Mantorville, MN (US)

( * ) Notice: Subject to any disclaimer, the term of this patent is extended or adjusted under 35 U.S.C. 154(b) by 177 days.

(21) Appl. No.: 11/463,794

(22) Filed: Aug. 10, 2006

(65) Prior Publication Data

US 2008/0039289 A1   Feb. 14, 2008

(51) Int. Cl.
*B62M 1/00* (2006.01)
(52) U.S. Cl. ......................................... 280/221; 482/54
(58) Field of Classification Search .................. 482/54; 280/209, 210, 228, 214, 220, 221, 200, 282, 280/236, 238, 259, 260, 261
See application file for complete search history.

(56) References Cited

U.S. PATENT DOCUMENTS

| | | | | |
|---|---|---|---|---|
| 1,696,927 | A | * | 1/1929 | Snyder ........................ 280/222 |
| 3,332,704 | A | * | 7/1967 | McVicker .................... 280/228 |
| 6,505,845 | B1 | * | 1/2003 | Fong ........................... 280/228 |
| 6,511,087 | B1 | * | 1/2003 | Fong ........................... 280/228 |
| 6,695,331 | B2 | * | 2/2004 | Jeng ............................ 280/228 |

* cited by examiner

*Primary Examiner*—LoAn H. Thanh
*Assistant Examiner*—Tam Nguyen
(74) *Attorney, Agent, or Firm*—Nawrocki, Rooney & Sivertson, P.A.

(57) ABSTRACT

An operator-propelled, four-wheel vehicle uses a treadmill to drive two rear wheels through a bicycle type derailleur and sprocket gear shifter which provides gear changing capability. The front wheels, each of which have disk brakes, are steered by an automotive type steering apparatus. A vertical extension from the steering mechanism at the front of the vehicle mounts a horizontal steering bar to provide steering control. The steering bar also mounts control grips and cables for the front disk brakes and clutch assembly, as well as the gear shifter. An automatic breaking system ensures that an unmanned vehicle will remain in place.

11 Claims, 3 Drawing Sheets

SELF-PROPELLED TREADMILL RECREATIONAL VEHICLE

BACKGROUND OF THE INVENTION

1. Field of the Invention

This invention relates to operator-propelled and directed land vehicles.

2. Description of the Related Art

There are a variety of operator propelled land vehicles. These include such things as bicycles, miniature automobiles, roller skates and scooters. None of these vehicles are intended to provide a variable walking or running exercise when carrying an individual from place to place.

SUMMARY OF THE INVENTION

This four-wheeled, treadmill-driven vehicle provides an individual with a method of selecting a desired walking or running exercise level while traveling from place to place under his own propulsion. The vehicle has a rectangular shaped chassis with four corner mounted wheels. A treadmill drives the rear wheels trough a chain. A bicycle derailleur gear changer is used to change the ratio of the vehicle's forward motion versus the treadmill belt motion.

A planar platform of essentially the same size and shape as the chassis is pivotably attached to the front of the chassis. The platform inclines upward from the rear of the chassis. The platform has three rotatably mounted shafts which extend transversely across the platform. A first and a second shaft are located across the front end, and a third shaft is located across the rear end. Front and rear rubber rollers enclose the first and third shafts within the outer lateral edges of the platform. The treadmill belt is wrapped lengthwise around the platform enclosing both rollers. A platen is attached to the upper surface of the platform to minimize friction between the belt and the platform. The front rubber roller is keyed to the first shaft to convert movement of the treadmill belt to rotation of the shaft.

The first and second front shafts have gears mounted on corresponding ends which mesh with each other. This engagement transmits the rotation of the belt driven first shaft to the second front shaft and reverses the direction, relative to that of the first shaft, of the second shaft's rotation. The opposite end of the second shaft has a larger gear attached to its end.

The third shaft has a number of different sized sprockets in successive sizes attached to the rear axle. These sprockets and the larger gear on the second front shaft are connected together by a chain. A derailleur engaging the chain is mounted between the sprockets and the front gear. This derailleur changes the ratio of the belt movement to movement over the ground by selecting successively different sized sprockets.

The rear wheels are attached to the rear shaft to transmit rear shaft rotation, driven by the chain from the second front shaft, to movement over the ground. A control cable from the derailleur to the front of the vehicle provides ready operator gear changer control. With this arrangement a forward facing operator driving the upper run of the treadmill rearward will move the vehicle in a forward direction.

An automatic parking braking apparatus is provided at the rear of the vehicle. The platform has a pair of rearward extensions which are supported by coil springs from the chassis. When there is no operator on the vehicle, the springs will be at their minimum compression and the rear of the platform will be elevated. A brake drum, in the form of a relatively large cylinder, is attached around the rear axle. A downward extension terminates in an inward curved extension which mates with the brake drum. The curved extension is positioned directly under the break drum. When there is no operator on the platform and the rear of the platform is elevated, the curved portion of the extension will engage the break drum thereby providing an automatic parking brake.

The front wheels are pivotably connected to the front of the vehicle through an automotive type steering arrangement. The front wheels are steered by the operator by means of a steering bar extending generally across the vehicle front. The steering bar is attached to the automotive steering arrangement through a pivotably mounted vertical rod. The front wheels also have disk brakes which are controlled by a cable extending to the steering bar where it is attached to a lever for easy operator access.

This operator propelled vehicle provides exercise for the user while simultaneously traveling from one location to another. Steering is readily accomplished by the steering bar at the front of the vehicle. The derailleur cable and break cables are attached to the steering bar for ready access. The automatic breaking system ensures that an unoccupied vehicle will remain in place even on a steep slope. The operator can disengage the rear axle from the drive train via a clutch mechanism attached to the rear axle assembly. The clutch is controlled by a cable which extends to the steering bar where it is attached to a lever for easy operator access.

BRIEF DESCRIPTION OF THE DRAWINGS

The objects and features of the present invention will become more manifest to those skilled in the art upon a reading of the following description, taken in connection with the accompanying drawings and wherein.

DETAILED DESCRIPTION OF THE INVENTION

Figure 1:
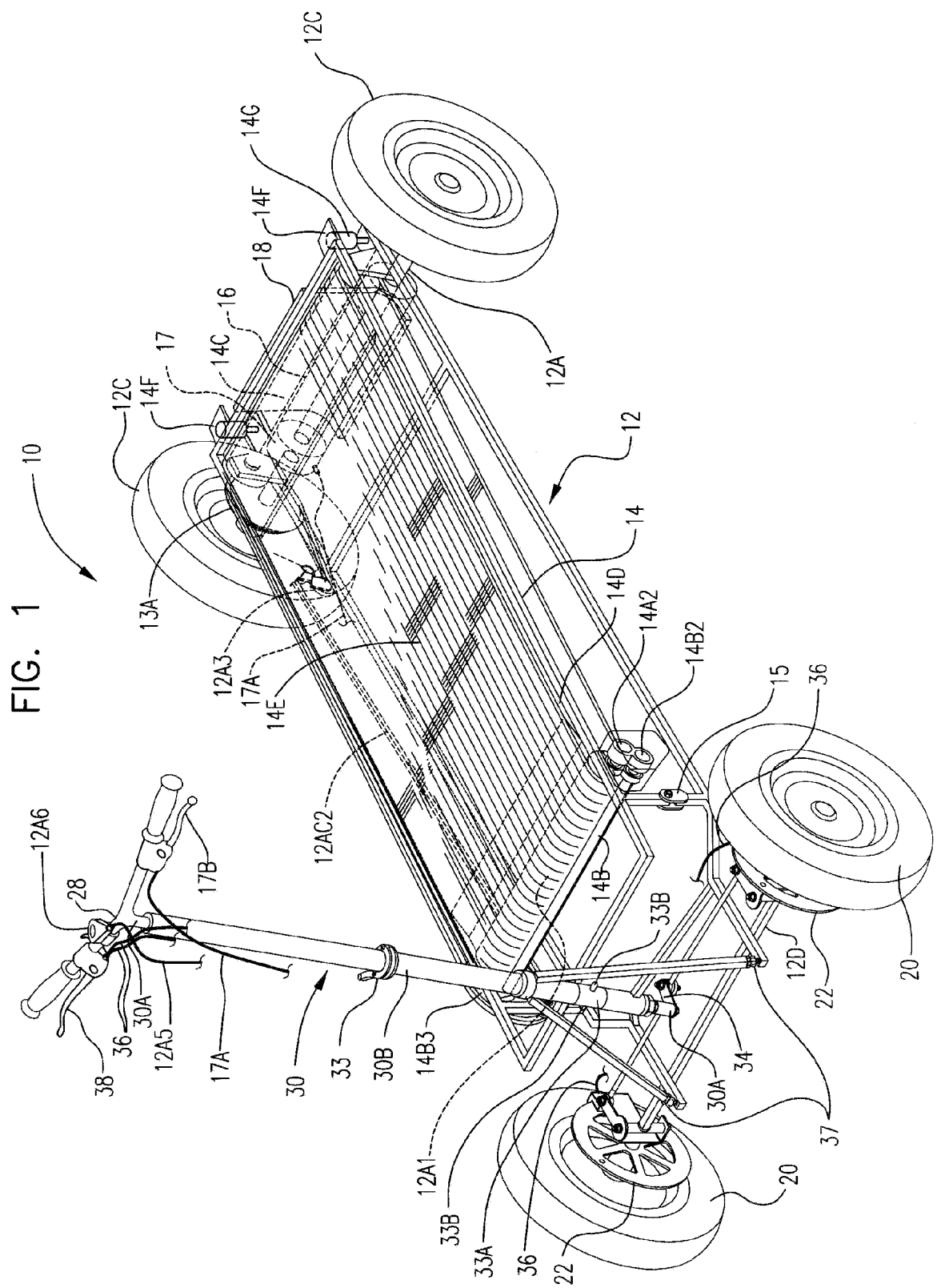
FIG. 1 is an isometric view of the vehicle.
Figure 2:
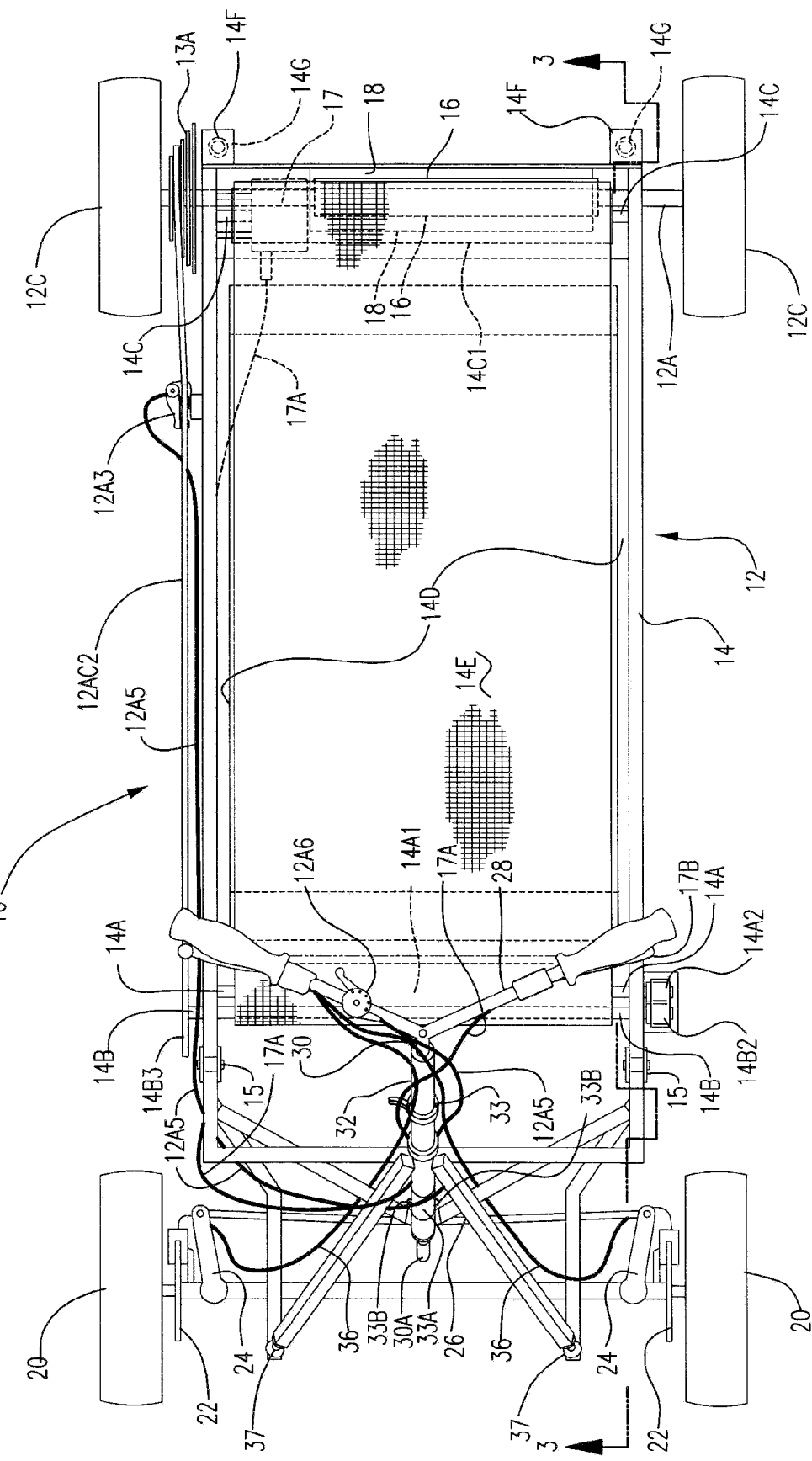
FIG. 2 is a top view of the vehicle.
Figure 3:
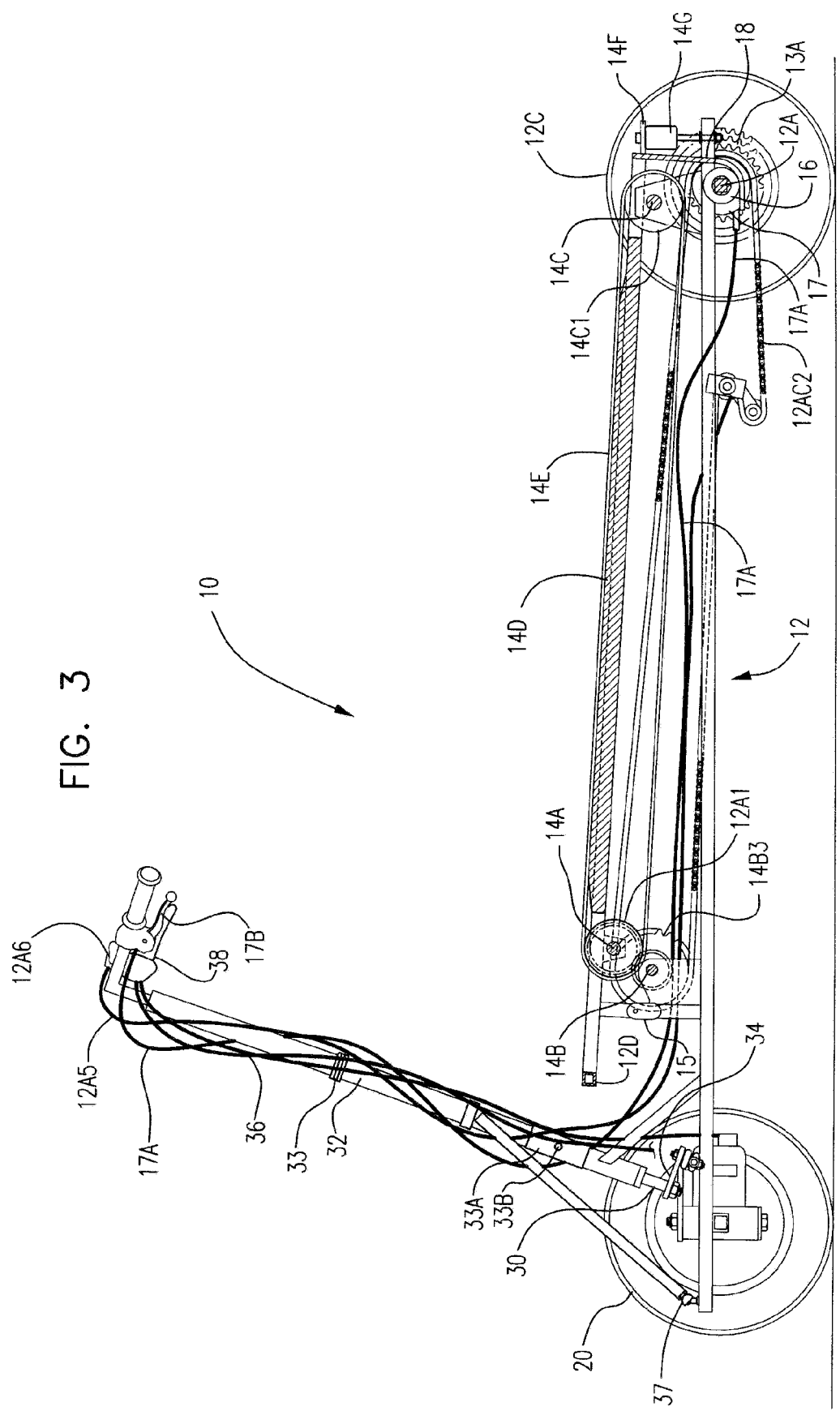
FIG. 3 is a side view of the vehicle.

FIGS. 1-3 show vehicle 10. Vehicle 10 has an essentially rectangular shaped chassis 12 with a generally similar sized and shaped frame 14 mounted in an upwardly inclined attitude in a forward direction across the upper surface. Chassis 12, it is envisioned, is formed from welded steel bars and frame 14 from a sheet of planar steel. The front end of frame 14 has pivot attachments 15 which pivotably attach downward extensions from each side of the front end of the frame 14 to opposite aligned upward extensions from each side of the front end of chassis 12 by means of a pin inserted through mating holes to enable the frame 14 to pivot about the front end of the chassis. The rear end of frame 14 is free. This freedom permits the frame 14 to pivot with respect to chassis 12.

Frame 14 has a front first shaft 14A and an adjacent front second shaft 14B. First shaft 14A extends across the front end of a frame-attached platform through ball bearings, not shown, in opposing holes in downward extensions from opposite sides. Front first shaft 14A has a rubber roller 12A1 over that portion of the shaft which is within the limits of frame 14. Rubber roller 12A1 is keyed to first shaft 14A. Shaft 14A has a first gear 14A2 attached to one end. Second shaft 14B extends through ball bearings in a gearbox cover, and the shaft 14B protrudes to the outside of the frame 14. Second front shaft 14B has a second gear 14B2 attached to the protruding end such that the gears, 14A2 and 14B2, intermesh. A larger third gear 14B3 is attached to the end of second front shaft 14B opposite to second gear 14B2. A third rear shaft 14C extends across the rear end of frame 14 through opposing holes in downward extensions from opposite sides at the rear of the platform. Third rear shaft 14C has a rubber roller 14C1 over that portion of the shaft 14C which is within the limits of the platform.

A plastic planar platen 14D overlies the upper surface of frame 14. A treadmill belt 14E is attached around rubber rollers 12A1 and 14C1 with the inner portion adjacent to the upper surface of platen 14D. Platen 14D minimizes friction between treadmill belt 14E and frame 14. The above apparatus provides a means of transferring force exerted on treadmill belt 14E to third gear 14B3.

A rear axle 12A is pivotably mounted across the rear of chassis 12 through holes in opposed downward projections from the rear of the chassis 12. A number of different sized sprockets 13A, arranged in successive sizes, are attached to the end of rear axle 12A essentially aligned with second gear 14B3 on the end of second front shaft 14B. Sprockets 13A are part of a bicycle type derailleur gear changer. A chain 12AC2 connects sprockets 13A to third gear 14B3. Derailleur 12A3 is attached to chain 12AC2 between sprockets 13A and third gear 14B3 arranged such that the derailleur can move the chain 12A2 from sprocket to sprocket and change the gear ratio. A control cable 12A5 extends from derailleur mechanism 12A3 to a control lever 12A6 for operator control of the derailleur 12A3. Rear wheels 12C are attached to opposite ends of rear axle 12A. This arrangement effects transfer of power from third gear 14B3 to rear axle 12A via sprockets 13A and drives the attached rear wheels 12C forward when the upper run of treadmill belt 14E is moved rearward by an operator. The arrangement also provides a means to change the treadmill gear ratio.

A clutch assembly 17 is mounted to a rear axle assembly and enables the operator to disengage the drive train from the treadmill assembly. This allows the operator to shift gears while the vehicle remains stationary or coasts. A clutch cable 17A extends from clutch assembly 17 to a clutch lever 17B for operator control of the clutch assembly 17.

An automatic parking breaking apparatus is provided by apparatus which includes horizontal planar projections 14F which extend rearward from opposite sides of frame 14. Gas shocks 14G are mounted between projections 14F and chassis 12. A brake cylinder 16 is mounted around rear axle 12A. Projection 18 has a first downward portion and a second inward portion with an upward concave surface to better conform to an outer surface of brake cylinder 16. Projection 18 is sized and arranged such that the second portion is below brake cylinder 16. Gas shocks 14G are arranged such that, with no operator standing on frame 14, the shocks 14G will force the platform upward such that the second portion of projection 18 will bear against cylinder 16 and provide an automatic brake by locking the rotation of rear axle 12A attached to the cylinder. Suitable breaking material can be applied to either or both of the mating break surfaces for a more positive brake connection.

Two front wheels 20 are rotatably mounted on each side of the front of vehicle 10 through bearings (not shown). Each front wheel 20 has a disk brake 22. The wheels 20, disk brakes 22 and steering arms 24 are pivotably attached as a unit and arranged to pivot relative to a vertical axis from a bar 12D attached to chassis 12, which bar 12D extends across the front of the chassis. Steering arms 24 are connected together by tie rods 26 arranged such that the pairs of steering arms 24 and wheels 20 will pivot together with the wheels remaining parallel to each other. A horizontally oriented steering hand bar 28 is attached to a cylindrically shaped vertical oriented steering tube assembly 30.

Steering tube assembly 30 is pivotably connected to chassis 12 by being extended through a quick release collar 33 pivotably connected to support stanchions and then into keyed tube 33A where it is secured in place by spring-loaded pins 33B, one protruding through a hole on either side of the keyed tube 33A. The support stanchions have ball joints 37 at the ends where they connect to the frame so that they may move upward or downward about a hinge point to permit steering tube assembly 30 to fold flat to the surface of the tread belt.

Steering tube assembly 30 is keyed to mate with keyed tube 33A to take rotational stress off of spring-loaded pins 33B. Keyed tube 33A is pivotably connected to chassis 12 by being extended through a mating cylinder 32 with ball bearings (not shown) perpendicularly attached to chassis 12 near the center of the front. Steering tube assembly 30 is composed of an inner tube 30A and an outer tube 30B. Cylinder 32 is sized to allow rotation of steering rod 30 within the cylinder. An offset tab 34, which is attached to the lower end of steering rod 30, has an extension, the distal end thereof being pivotably attached to the end of each tie rod 26 through matching holes in the tie rod and extension. Tab 34 and tie rods 26 are secured by nuts and bolts. With this arrangement, moving steering bar 28 will cause front wheels 20 to train while remaining essentially parallel to one another to provide operator control of steering. A control cable 36 from both disk brakes 22 extends to a hand grip 38 mounted on steering bar 28 to provide operator braking control. Control cable 12A5 from derailleur 12A3 extends to control lever 12A6. Control lever 12A6 is also mounted on steering bar 28 for operator gear changing control.

While various parts of this invention have been described with specific embodiments a number of other arrangements would occur to one skilled in the art. A tensioner could be added to the chain apparatus. The treadmill belt could be slotted for additional friction between the operator and the belt. A brush could be added to the belt apparatus to provide automatic cleaning of the belt surface. A variety of other arrangements which transfer power from the treadmill belt to the rear wheels could be employed. The breaking apparatus both for parking and during transit could be changed as long as they provided the necessary breaking functions. The steering apparatus could be one of a number known in the art for steering the front wheels while keeping the front wheels essentially parallel with each other. Since the above are just a few examples of the modifications and changes that are possible, that would readily occur to one skilled in the art, it is contemplated that the appended claims will cover any such modifications or embodiments as fall with the true scope of the invention.

What is claimed is:

1. An operator carrying vehicle comprising:
   a) a frame having a front and a rear end;
   b) at least one wheel rotatably mounted under the front end of the frame;
   c) a pair of offset rear wheels rotatably mounted under the rear end of the frame at opposite sides;
   d) operator means for powering the rear wheels;
   e) means for steering the front wheel;
   f) a rear axle rotatably mounted under and across the rear end of the frame with the rear wheels being attached to opposite ends thereof to rotate therewith; and
   g) operator means for powering the rear axle, the operating means comprising:

i) a platform of essentially the same dimensions as the frame, the platform being pivotally attached to the front of the frame inclining downward from the front to the rear;
ii) a first, second and third shaft rotatably mounted across the platform, with the first and second shafts adjacent and parallel to each other at the front of the platform, and the third shaft at the rear of the platform parallel to the first and second shafts, the first, second and third shafts all having first and second ends with the respective first and second ends of the shafts being on the same side of the platform;
iii) a first rubber roller keyed to and enclosing the first shaft, and a second rubber roller enclosing the third shaft;
iv) a planar plastic platen disposed on the platform, the platen being essentially the same shape and size as the platform;
v) a treadmill belt enclosing the platen and the first and second roller;
vi) a first gear mounted on the first end of the first shaft and a second gear mounted on the first end of the second shaft with the first and second gears meshing;
vii) a third gear mounted on the second end of the second shaft opposite the second gear and a plurality of successively sized sprockets mounted on an end of the rear axle; and
viii) a chain connected to the third gear and the plurality of sprockets such that rotation of the treadmill belt drives the rear axle.

2. A vehicle as in claim 1 wherein the frame is essentially rectangular in shape with the front and rear ends located at opposite ends along the major dimension, the frame having two offset front wheels rotatably mounted on opposite sides of the front, with the steering means further comprising means for steering the front wheels.

3. A vehicle as in claim 2 wherein the front wheels have brake means for stopping the vehicle.

4. A vehicle as in claim 3 wherein the brake means comprises disk brakes, a pair of control cables and a hand grip, with a disk brake being mounted on each wheel, with the hand grip being attached to the front of the vehicle at a location convenient for operator manipulation, and with a control cable being attached between a disk brake and the hand grip, arranged such that the hand grip can simultaneously engage or disengage both disk brakes.

5. A vehicle as in claim 2 wherein said steering means for steering the front wheels comprises a pair of steering arms and a tie rods, a steering bar, a steering tube assembly, a hollow cylinder and an offset with a center portion which can engage an end of the steering rod an extension which is essentially perpendicular to the center portion, each wheel is pivotably attached about an axis which is essentially perpendicular to the frame, each wheel having an attached steering arm arranged to pivot the wheel around the perpendicular axis, the hollow cylinder being sized to permit the steering tube assembly to pivot therewithin and attached to the front of the frame essentially at the center in an essentially perpendicular orientation, the steering rod being extended through the cylinder and ball bearings, the steering bar attached to the upper end of the rod and the offset attached to the lower end of the rod, with the outer end of its extension pivotably attached to the central ends of the tie rods, and with the outer ends of the tie rods being pivotably attached to the ends of the steering arms, the parts being sized and arranged such that rotating the steering bar will pivot the front wheels about a predetermined arc while maintaining an essentially parallel relationship between the wheels.

6. A vehicle as in claim 1 wherein the means for driving the rear axle further comprises a derailleur, a derailleur control cable and a control cable lever, the plurality of successively sized sprockets being attached in successive size to the rear axle within the wheel on the side of the platform as the third gear, with one of the sprockets being connected to the third gear by the chain, the derailleur being attached to the frame with the chain routed around the cogs of the derailleur, between the sprockets and the third gear, arranged to transfer the chain from sprocket to sprocket when operated by the derailleur control cable, the control cable extending from the derailleur to the control cable lever, the control cable lever being mounted on the front of the vehicle at a location readily accessible to the operator.

7. A vehicle as in claim 2 further comprising automatic braking means for locking the rear axle and wheels when no operator is aboard the vehicle.

8. A vehicle as in claim 7 wherein said automatic breaking means comprises:
a) planar horizontal rearward platform extensions from each corner of the platform;
b) gas shocks mounted between the rearward platform extensions and the frame which are selected to elevate the rear end of the platform with a predetermined force when no operator is aboard the vehicle;
c) a cylinder mounted on and enclosing the central portion of the rear axle;
d) an extension from the rear of the platform having a first and a second portion, with the first portion being attached extending downward from the rear of the platform and the second portion extending inward from the first portion, the first and second portion being sized such that the second portion extends inward under the cylinder, the second portion being upwardly concave to essentially mate with the outer surface of the cylinder, the downward extension having a length such that, when an operator is on the platform, the shocks will be compressed and the second portion of the extension will be clear of the cylinder.

9. A vehicle as in claim 1 having clutch assembly means for disconnecting the operator means for powering the rear axle from the rear axle.

10. A vehicle as in claim 5 having means for adjusting the length of the steering assembly.

11. A vehicle as in claim 5 having means for collapsing the steering assembly.

* * * * *